April 5, 1966
G. A. PERSON
3,245,065
DIGITAL ZERO OFFSET POSITION INDICATOR
Filed April 10, 1959
2 Sheets-Sheet 1
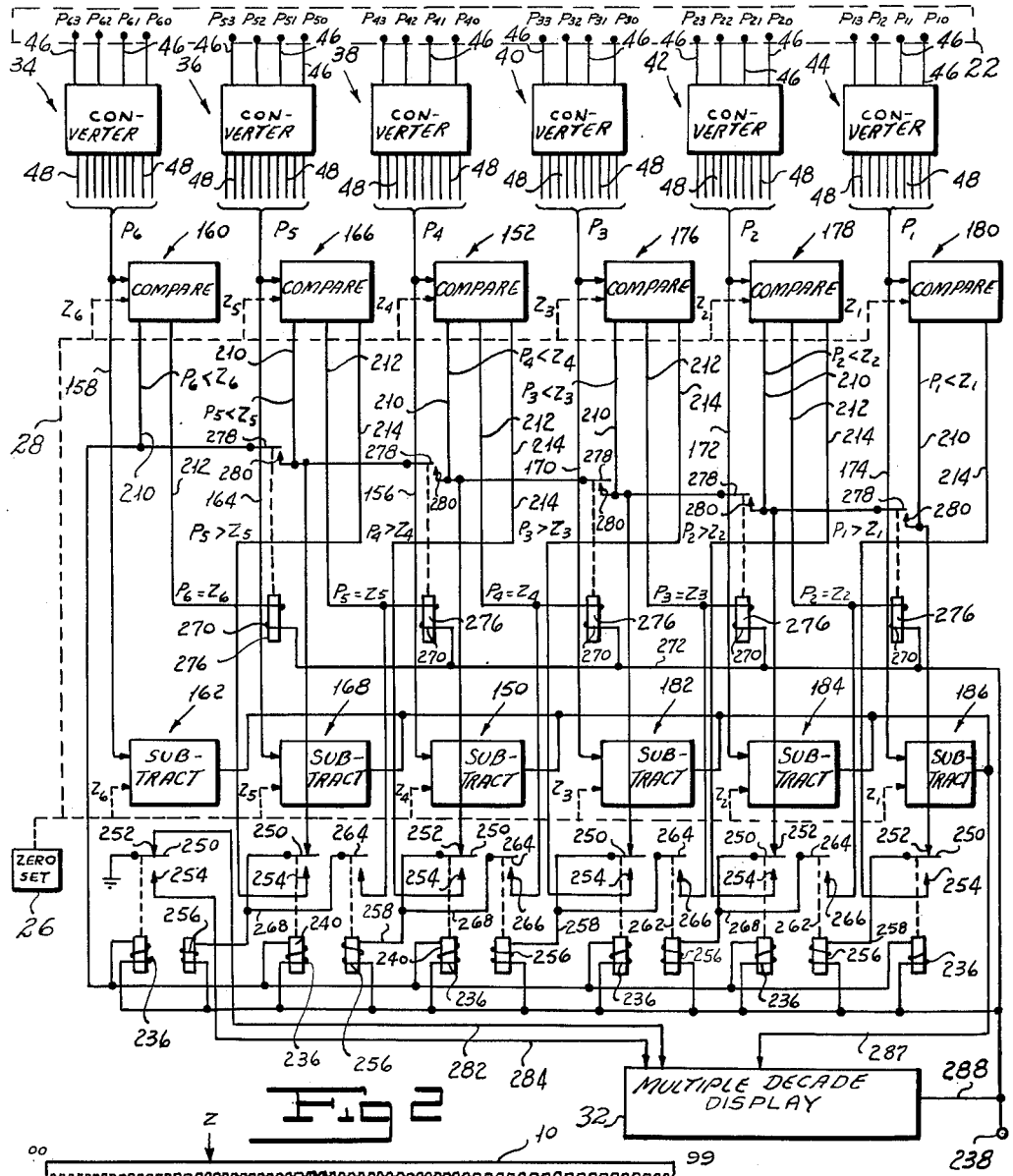
INVENTOR.
GEORGE A. PERSON
BY
ATTORNEY April 5, 1966  G. A. PERSON  3,245,065
DIGITAL ZERO OFFSET POSITION INDICATOR
Filed April 10, 1959  2 Sheets-Sheet 2
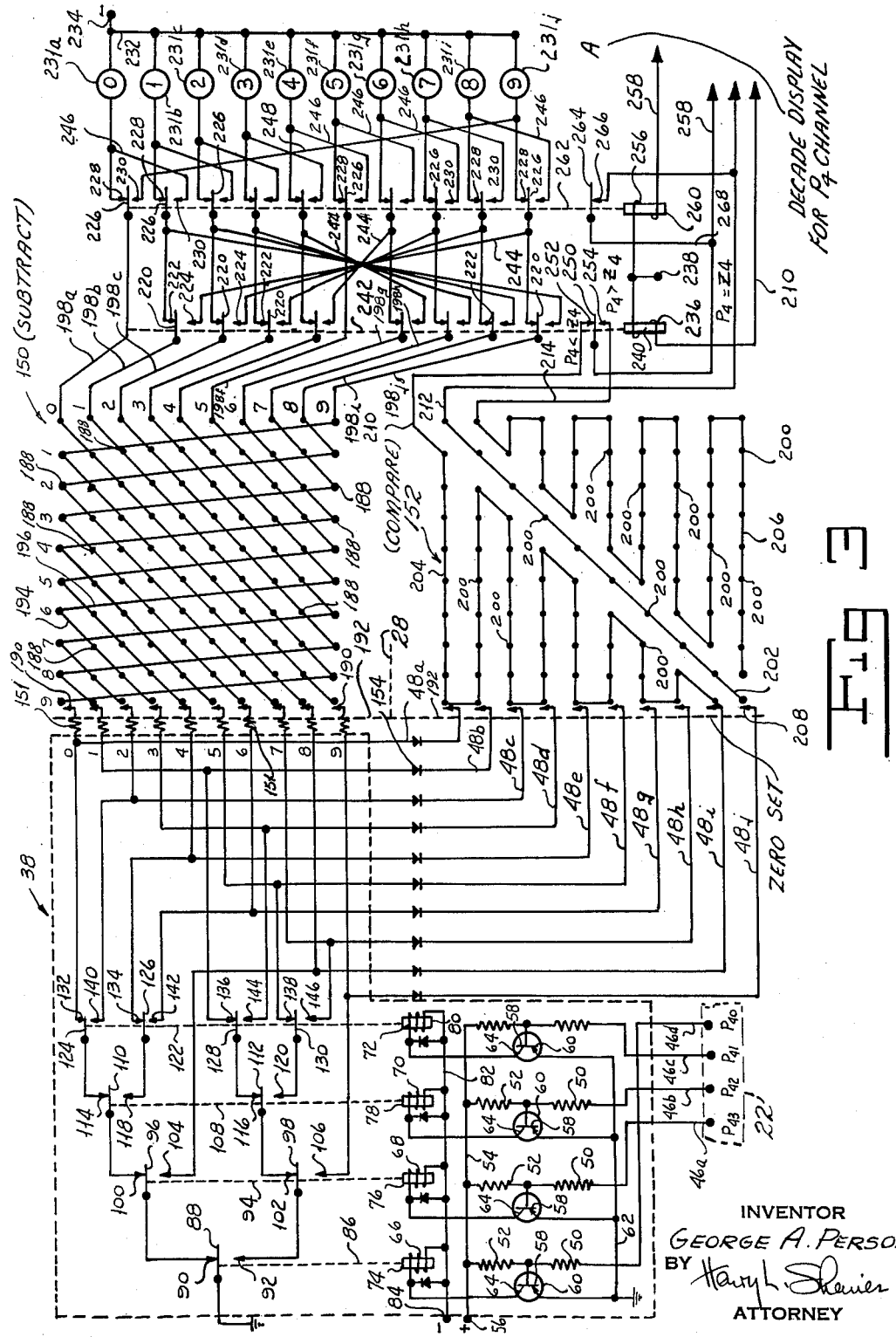
INVENTOR
GEORGE A. PERSON
BY Harry L. Shenier
ATTORNEY

United States Patent Office 3,245,065
Patented Apr. 5, 1966

3,245,065
DIGITAL ZERO OFFSET POSITION INDICATOR
George A. Person, Flushing, N.Y., assignor to United Aircraft Corporation, East Hartford, Conn., a corporation of Delaware
Filed Apr. 10, 1959, Ser. No. 805,620
7 Claims. (Cl. 340—178)

My invention relates to a digital zero offset position indicator and more particularly to apparatus for producing an indication of the actual position of a movable member with respect to an arbitrary zero position within the range of movement of the member.

In the prior art, systems are known for providing an indication of the position of a machine tool or the like with reference to a fixed zero position on the machine. Control systems are known in the art for producing a control signal in response to a comparison of the signal representing displacement from the zero position with a signal representing the desired position or movement of the tool.

It is often desirable that a machine operator be provided with an indication of the position of the machine tool with respect to any arbitrary zero position within the possible range of travel of the tool across the machine workholder. This zero position may, for example, be a point on the workblank from which a desired operation is begun. If the machine operator were continuously given an indication of the position of the tool with respect to such a zero point, he could readily machine the workblank to any desired dimension from the zero point. It is further desirable that the machine operator be permitted to adjust the zero position with ease. With a system of this nature, the operator could work directly from blueprint dimensions merely by setting the zero point at the position at which an operation is to be commenced and by stopping the machine when the indicator shows a movement of the tool corresponding to the dimension on the print.

While the machine tool indicating and control systems of the prior art are satisfactory for the purposes for which they are intended, they do not permit achievement of the desirable operation outlined hereinabove. I have invented a digital zero offset position indicator which continuously provides an indication of the position of a movable member such as a machine tool with respect to an arbitrarily selected zero position. My indicator permits the zero position to be quickly and easily set by the operator to any point within the range of movement of the member whose position is being indicated. My indicator permits a machine operator to work directly with blueprint dimensions in forming a workblank without the necessity of first relating these dimensions to movements of a tool with reference to a fixed zero position. My indicator shows not only the amount of displacement of the tool from the zero position but also gives an indication of the direction of the displacement.

One object of my invention is to provide a digital offset position indicator for continuously producing an indication of the displacement of a movable member.

Another object of my invention is to provide a digital zero offset position indicator which permits the zero position of a movable member to be readily and easily set to any position within the range of movement of the member.

A further object of my invention is to provide a digital zero offset position indicator which indicates not only the magnitude of displacement of a movable member from its zero position but also the direction of displacement.

A still further object of my invention is to provide a digital zero offset position indicator which permits a machine operator to work directly with blueprint dimensions in forming a workblank.

Other and further objects of my invention will appear from the following description:

In general my invention contemplates the provision of a digital zero offset position indicator for use with a movable member including a plurality of subtraction matrices, each of which is adapted to produce an indication of the difference between a pair of digits, representations of which are fed to the subtraction matrices, and a plurality of comparison matrices, each of which produces an indication of the relative magnitude of a pair of digits whose representations are fed to the matrix. I couple the movable member to the shaft of a binary-coded analogue-to-digital converter and connect the converter output to a conversion matrix which produces respective signals representing the digits making up the number indicating the actual position of the movable member. I provide means by which the machine operator may set digits making up an arbitrarily selected zero position number into the subtraction and comparison matrices. I feed the conversion matrix signals representing the digits of the actual position number to the respective matrices of both the comparison and subtraction matrices. Thus each subtraction matrix produces an indication of the difference between the zero position digit and the actual position digit. Means responsive to the comparison matrix outputs actuates the subtraction matrices to account for situations in which one must be borrowed from the next most significant place in order to perform the subtraction operation. This last named means also provides an indication of the direction of displacement. I provide my indicator with a display responsive to the last named means and to the subtraction matrix output signals for indicating to the machine operator both the magnitude and the direction of the displacement of the tool or the like from the arbitrarily selected zero position.

In the accompanying drawings which form part of the instant specification and which are to be read in conjunction therewith and in which like reference numerals are used to indicate like parts in the various views:

FIGURE 1 is a block diagram illustrating the various parts of my digital zero offset position indicator.

FIGURE 2 is a simplified schematic view of a portion of my digital zero offset position indicator.

FIGURE 3 is a schematic view showing the details of a portion of my digital offset position indicator associated with one digit of position.

Referring now more particularly to FIGURE 1 of the drawings, the machine tool (not shown) or the like with which my indicator is used includes a member 10 provided with rack teeth 12 or the like and adapted to be moved to any position within the position range of from 00 to 99, for example, with reference to the machine frame. Teeth 12 drive a pinion 14 carried by a shaft 16. I have indicated an arbitrary zero position Z of the member 10 within its range of movement by the arrow Z in FIGURE 1.

Any suitable mechanical linkage indicated schematically at 18 in FIGURE 1 couples the shaft 16 to the input of a binary-coded decimal anaogue-to-digital converter 20 The converter 20 may be of any suitable type known in the art which is capable of producing respective binary representations of the digits making up a number representing the analogue input position of its shaft. Preferably, I employ the analogue to binary-coded system converter disclosed in the copending application of Martin Ziserman, Serial No. 589,624 filed June 6, 1956, now Patent No. 2,873,422, issued February 10, 1959. A channel 22 couples the output of converter 20 to a subtraction unit 24 which is adapted to subtract algebraically a binary-coded decimal number and a decimal number set into the unit 24 to produce output signals representing this algebraic difference as a decimal number. A knob or the like 26 operates a mechanical linkage 28 to set any arbitrary zero position of the member 10 within its range into the unit 24. A channel 30 couples the output signals from the unit 24 to the input terminals of a display unit 32 which may, for example, provide a visual indication of the actual position of the member 10 with reference to the arbitrary zero point.

Referring now to FIGURE 2, I have shown the details of the subtraction unit 24 in simplified schematic fashion. The unit 24 includes a plurality of conversion matrices indicated generally by the respective reference characters 34, 36, 38, 40, 42, and 44. Each of these conversion matrices has four input terminals 46 and ten output conductors 48. I apply the bits of the binary-coded decimal representation of one digit of the output of converter 20 to the respective terminals 46 of one of the conversion matrices. In response to such a binary-coded input, a conversion matrix such as the matrix 34 energizes one of its output conductors 48 corresponding either to zero or to one of the respective digits from 1 to 9.

Referring now to FIGURE 3, I have by way of example shown the details of the conversion matrix 38 indicated schematically in FIGURE 2. It will be understood that all the matrices 34, 36, 38, 40, 42, and 44 are substantially identical. The input terminals 46a, 46b, 46c, and 46d of the matrix 38 receive the respective binary bits representing the digit in third most significant place of the output of converter 20 in order of significance from the most significant bit to the least significant bit. I connect a respective voltage divider including resistors 50 and 52 between each terminal 46 of matrix 38 and a common conductor 54 connected to the terminal 56 of a suitable source of positive potential. I connect the respective bases 58 of a plurality of normally nonconducting transistors 60 to the common terminals of the respective pairs of resistors 50 and 52. A conductor 62 connects the emitters of the transistors 60 to ground. I connect the respective collectors 64 of transistors 60 to the windings 66, 68, 70, and 72 of relays having armatures 74, 76, 78, and 80. A common conductor 82 connects the other terminals of the windings 66, 68, 70, and 72, to a negative terminal 84 of a suitable source of potential.

From the structure just described it will be appreciated that in response to the presence of a negative-going pulse, representing a binary bit, at a respective terminal 46a, 46b, 46c, and 46d, the associated transistor 60 conducts to cause the corresponding winding 66, 68, 70, or 72 to be energized.

When winding 66 is energized armature 74 operates a linkage 86 to move a contact arm 88 out of engagement with contact 90 and into engagement with a contact 92. In response to energization of winding 68 armature 76 operates a linkage 94 to move contact arms 96 and 98 from normally engaged contacts 100 and 102 to respective contacts 104 and 106. In response to energization of winding 70, armature 78 operates a linkage 108 to move contact arms 110 and 112 from normally engaged contacts 114 and 116 into engagement with contacts 118 and 120. In response to energization of winding 72, armature 80 operates a linkage 122 to move contact arms 124, 126, 128, and 130 away from respective normally engaged contacts 132, 134, 136, and 138 and into engagement with respective contacts 140, 142, 144, and 146.

I connect the respective contacts 90 and 92 to arms 96 and 98. I connect contacts 100 and 102 to arms 110 and 112 respectively. I connect the contacts 114 and 118 respectively to arms 124 and 126 and connect the contacts 116 and 120 to the respective arms 128 and 130. I connect the respective contacts 132, 136, 140, 144, 134, 138, 142, 146, 104, and 106 to the output conductors 48a to 48j of the conversion matrix 38. The conductors 48a to 48j correspond respectively to zero and to the digits from 1 to 9. I connect switch arm 88 to ground.

By way of example, if the P4 digit of the actual position number P is 5, represented in binary-coded form as 0101, negative-going pulses appear respectively at terminals 46b and 46d to energize windings 66 and 70 to move contact arm 88 into engagement with contact 92 and to move arms 110 and 112 into engagement with contacts 118 and 120. When this has been done, a circuit is complete from ground through arm 88 and contact 92, through arm 98 and contact 102, through arm 112 and contact 120, through arm 130 and contact 138 to conductor 48f which corresponds to the digit 5. In response to the other binary-coded inputs representing various digits of the actual position number, others of the conductors 48 are connected to ground.

Resistors 151 connect respective conductors 48a to 48j to the input terminals of a subtraction matrix, indicated generally by the reference character 151. I also connect conductors 48a to 48j of the conversion matrix 38 to the respective input terminals of a comparison matrix, indicated generally by the reference character 152. I dispose respective diodes 154 in each of the conductors 48a to 48j. For the purposes of clarity, in FIGURE 2 I have indicated the connections from the conversion matrix 38 to the comparison matrix 152 and to the subtraction matrix 150 by a channel 156. I make similar connections between the other conversion matrices and comparison and subtraction matrices. A channel 158 couples the output of conversion matrix 34 to a comparison matrix 160 and a subtraction matrix 162. A channel 164 couples the output of matrix 36 to a comparison matrix 166 and to a subtraction matrix 168. Channels 170, 172, and 174 couple the outputs of the respective matrices 40, 42, and 44 to respective comparison matrices 176, 178, and 180 and to respective subtraction matrices 182, 184, and 186.

Referring again to FIGURE 3, for purposes of clarity I have shown only the matrices 150 and 152 in detail. The subtraction matrix 150 includes ten banks of contacts 188 and a respective brush 190 associated with each of the banks of contacts 188. There are ten contacts 188 in each bank. I gang the brushes 190 by means of a linkage 192 to permit the brushes to be moved in unison to engage corresponding contacts 188 from all banks. The respective banks of contacts 188 from top to bottom, as viewed in FIGURE 3, correspond to zero and to the digits from 1 to 9 for the brush, or actual position P, input, of the subtraction matrix. Vertical lines of contact from right to left, as viewed in FIGURE 3, correspond respectively to zero and to the digits from 1 to 9 of the brush position, or zero position, input to the subtraction matrix 150. Thus each contact corresponds to one digit of the actual position input and to one digit of the zero position input. Conductors 194 connect the last or left-hand contacts, as viewed in FIGURE 3, of the respective banks, save the first bank to the respective contacts of the first or top bank, as viewed in FIGURE 3. It is to be understood that these conductors 194 also connect intermediate contacts through which they pass. Respective conductors 196 connect the contacts 188 of the first or top bank except the last contact thereof to the contacts 188 of the tenth or lowest bank which correspond to digits which are next lower to those digits to which the contacts of the first bank correspond. From the arrangement just described, with the brushes 190 in any position and with one of the brushes connected to ground through the conversion matrix 38, one of the output conductors 198, which are connected to the last contact of each bank, is connected to ground through the subtraction matrix 150 and through the conversion matrix 38. For example, if the linkage 192 is moved to a position corresponding to the digit 3, which is the position of the bank of contacts fourth from the right, as viewed in FIGURE 3, and with the brush 190 connected to conductor 48j grounded, the output conductor 198g corresponding to the digit 6, which represents the difference between 9 and 3, is connected to ground. As will be explained in detail hereinafter, my subtraction matrix is adapted to produce the correct difference where the minuend, which is the actual position input, is less than the subtrahend, which is the zero position input, necessitating the borrowing of one from the digit in the next most significant place.

The comparison matrix 152 includes contacts 200 arranged in ten banks of ten contacts each. A conductor 202 connects the lower lefthand contact of the matrix to the upper righthand contact of the matrix and all intermediate contacts in series. A conductor 204 connects all contacts to the left of conductor 202 in series beginning with the last or lefthand contact of the next to last bank of contacts and ending with the second contact of the first bank. A conductor 206 connects all the contacts 200 to the right of conductor 202 in series beginning with the next to last contact of the last bank and ending with the first contact of the second bank. I provide respective brushes 208 actuated in unison by the linkage 192 for engaging the contacts of the respective banks. I connect respective output conductors 210, 212, and 214 to the second contact 200 of the first bank, to the first contact of the first bank, and to the first contact of the second bank. The arrangement of the comparison matrix 152 is such that with the brushes 208 in any position and with one of the conductors 48a to 48j connected to ground, one of the conductors 210, 212, and 214 is connected to ground. In the arrangement shown if the conductor 214 is connected to ground, it indicates that the actual position input digit is greater than the zero position input digit. If conductor 212 is connected to ground, it indicates that the actual position input digit is equal to the zero position input digit. If conductor 210 is connected to ground, it indicates that the zero position input digit is greater than the actual position input digit.

Referring again to FIGURE 2, I provide the knob 26 for operating the linkage 28 to operate the linkage 192 associated with the subtraction matrix 150 and the comparison matrix 152. To avoid confusion, I have not shown individual linkages 192 in FIGURE 2, it being understood that one linkage is provided for the comparison matrix and the subtraction matrix associated with each digit of the zero offset input position number.

Referring again to FIGURE 3, I connect the output conductors 198b to 198j corresponding to the respective digits 1 to 4 and 6 to 9 of the subtraction matrix 150 to respective contact arms 220 normally in engagement with the upper contact 222 of its contacts 222 and 224. I connect the upper contacts 222 to respective contact arms 226 normally in engagement with the upper contacts 228 of pairs of contacts 228 and 230. I connect the conductors 198a and 198f corresponding to zero and 5 directly to contact arms 226. I connect indicating devices such, for example, as lamps 231a to 231j between the respective contacts 228 and a common conductor 232 connected to the terminal 234 of a suitable source of negative potential. A relay winding 236 connected between the terminal 238 of a source of negative potential and the conductor 210 of the comparison matrix 160 is adapted to be energized to cause its armature 240 to operate a linkage 242 to move arms 220 out of engagement with contacts 222 and into engagement with contacts 224. Conductors 244 interconnect the contacts 224 and the arms 226 to cause the subtraction unit to produce the correct output indication in the event that the zero position number, or subtrahend, is greater than the actual position number, or minuend, as will be described hereinafter. Conductors 246 connect the contacts 230 corresponding to respective digits from 1 to 9 to the lamps 231 corresponding to the digits which are one unit lower. A conductor 248 connects the contact 230 corresponding to zero to the lamp 231j corresponding to the digit 9.

There are as many windings 236 as there are places in the position number. Referring again to FIGURE 2, each winding 236, when energized, is adapted to move the contact arm 250 of an additional switch from a normally engaged contact 252 into engagement with a contact 254. I connect respective relay windings 256 corresponding in number to the places of the position number between terminal 238 and the contact arms 250 of the switches corresponding to the next least significant places of the position number. This may be accomplished, for example, by respective conductors 258.

When energized, winding 256 causes its armature 260 to operate a linkage 262 to move arms 226 out of engagement with contacts 228 and into engagement with contacts 230. Linkage 262 operates an additional switch to cause an arm 264 to move into engagement with a contact 266. I connect the switch including arm 264 and contact 266 between a conductor 268 connected to arm 250 and the conductor 212. I connect the contact 252 to the conductor 210 of the unit corresponding to the particular digit with which the contact is associated.

Respective relay windings 270 connected between the conductors 212 and a common conductor 272 connected to terminal 238 are adapted to be energized to cause their armatures 276 to move arms 278 into engagement with contacts 280. I connect each switch including arm 278 and contact 280 between the conductors 210 of a pair of adjacent comparison matrices.

Respective conductors 282 and 284 connect the contacts 252 and 254 of the switch including arm 250 associated with the winding 236 corresponding to the most significant place to the display unit indicated by the block 26 in FIGURE 2. A conductor 288 connects the display unit to the terminal 238. A channel 287 carries the output signals on conductors 198 to the display unit 286.

From the structure thus far described, it will be apparent that one output conductor 48 of each of the units 34, 36, 38, 40, 42, and 44 carries an output signal representing one digit of the actual position number of the movable member 10. The channels 158, 164, 156, 170, 172, and 174 apply these output signals to the comparison and subtraction matrices. The zero position setting device is operated to position the brushes of the comparison and subtraction matrices at locations corresponding to the digits of the desired zero position number.

The operation of my digital zero offset position indicator can best be understood by considering particular examples. Let us assume that the actual position number P, the binary representations of which are fed to the conversion matrices, is 735, 629 and that the desired zero position set into the system by means of the device 216 is 528, 809. First considering the operation of the conversion matrix 34 for the most significant digit of the actual position number conductors 46b, 46c, and 46d, all carry signals representing ones in the binary code. Thus windings 66, 70, and 72 are energized to close their associated switches to complete a circuit from ground through arm 88 and contact 92, through arm 98 and contact 102, through arm 112 and contact 120, and through arm 130 and contact 146 to the conductor 48h representing the digit 7, the remaining conversion matrices operate in a similar manner to energize one of their output conductors which corresponds to the digit represented by the binary input to the particular matrix. The respective channels 158, 164, 156, 170, 172, and 174 carry the conversion matrix outputs to the comparison and subtraction matrices. The operator positions the brushes 190 and 208 of the comparison and subtraction matrices in accordance with the desired zero position. considering the places of the zero position number and the actual position number in order of significance from the least significant to the most significant with the brushes 190 and 208 of the comparison and subtraction matrices 180 and 186 corresponding to the digit of the least significant place in the ninth position in engagement with the ninth contacts of the banks of contacts 188 and 200 and with the conductor 48$j$ connected to ground, it can be seen that conductors 198$a$ and 212 both are connected to ground. As a result, the lamp 231$a$ is lit to indicate a zero.

In a similar manner, since $P_2$ is greater than $Z_2$ by 2, the conductor 198$c$ is energized to light lamp 231$c$ and at the same time the conductor 214, indicating that $P_2$ is greater than $Z_2$, is energized. For the fourth most significant place $P_3$ is less than $Z_3$ to cause the subtraction matrix 176 to borrow one, in effect, from the digit in the next place of higher significance to energize the conductor 198$i$ to energize the lamp 231$i$ corresponding to the digit 8 and to connect the conductor 210 to ground. Connection of the conductor 210 to ground completes a circuit for the relay winding 256 of the third most significant place to cause the arms 226 of the subtraction matrix for this place to move into engagement with contacts 230 to subtract 1 from the result which normally would be produced in this place.

For the third most significant place, again we have $P_4$ less $Z_4$ so that we must borrow from the digit in the second most significant place. With a brush input of the digit 5 and a brush position input of the digit 8, the subtraction matrix 150 energizes the conductor 198$h$ corresponding to the digit 7. It will be remembered, however, that we borrowed one from this place with the result that winding 256 has moved all the contact arms 226 into engagement with contacts 230. Thus the lamp 231$g$ corresponding to the digit 6 rather than the lamp 231$h$ corresponding to the digit 7 is lit.

The digit $P_5$ in the next-to-most significant place is greater than $Z_5$ digit, but we have borrowed from this place so that we must subtract one from our normal result. My matrix 168 accomplishes this result to light the lamp 231$a$ for this place rather than the lamp 231$b$ which would be lit if no borrowing operation had taken place immediately preceding this. For the most significant place no borrowing operation has taken place, and the system causes the lamp 231$c$ of this place to light.

As a result of the operation just described, six lamps 231 corresponding respectively to the digits 2, 0, 6, 8, 2 and 0 have been lighted correctly indicating the displacement of the movable member from the zero position.

By way of a second example of the manner of operation of my zero offset position indicator, let us consider a case in which the zero position number Z is greater than the actual position number P. For example, let $P=492805$ and let $Z=631816$. In this case let us first consider the most significant place in which $P_6$ is less than $Z_6$. Where this is the case, the matrix 160 connects conductor 210 to ground to energize all windings 236 to move all the arms 250 into engagement with contacts 254 and to move the groups of contact arms 220 of the respective subtraction matrices into engagement with their contacts 224. Remembering that this operation has taken place, we will next consider the places in order of significance from the least significant toward the most significant. Since $P_1$ is less than $Z_1$, it would be thought that in accordance with the operation outlined hereinabove we would be borrowing 1 from the digit in the place next higher in order of significance to subtract 6 from 15. However, owing to the fact that the contact arms 220 now engage contacts 224, the subtraction matrix 186 lights the lamp 231$b$ corresponding to the digit 1 rather than the lamp 231$j$ corresponding to the digit 9. Since no actual borrowing operation took place here, the winding 256 of the next to least significant place should not close. It will be seen that it does not even though the comparison matrix 186 indicates that $P_1$ is less than $Z_1$, since arm 250 associated with the least significant place is out of engagement with contact 252. Since $P_2$ is less than $Z_2$, the matrix 184 operates in the same manner as the matrix 186 to light the lamp 231$b$ in the next to least significant place to indicate the digit 1. Since $Z_3$ is equal to $P_3$, the lamp 231$a$ in the fourth most significant place is lit. In the third most significant place $P_3$ is greater than $Z_3$. It will be remembered, however, since we are determining an algebraic difference between the two numbers, we are actually subtracting P from Z rather than the reverse so that here we must borrow. The matrix 150 lights the lamp 231$j$ indicating the digit 9. The winding 256 associated with the next to the most significant place is energized by a circuit through arm 250 and contact 254 and through the conductor 214 corresponding to the third most significant place.

Considering the next to most significant place, we see that we must again borrow since the subtrahend P is greater than the minuend Z in this place. Thus the matrix 150 connects the switch arm 226 corresponding to the digit 4 to ground. However, since we already borrowed from this place with the result that arms 226 are in engagement with contacts 230, the lamp 231$d$ corresponding to the digit 3 is energized. For the most significant place from which we have borrowed, the matrix 162 lights the lamp 231$b$ for this place. It will be seen that in order of significance lamps representing the number 139011 have been lit to indicate the correct algebraic difference of the numbers. It will be remembered that the arm 250 corresponding to the most significant place has been moved from contact 252 to contact 254. This operation couples conductor 284 rather than conductor 282 to ground with the result that the display device 286 indicates a direction of displacement opposite to that which it indicated where the actual position number P was greater than the zero position Z.

In each place where the P digit is equal to the Z digit, the conductor 212 is connected to ground. This energizes the associated winding 270 to cause the corresponding arm 278 to engage its contact 280. These switches including arms 278 and 280 operate in the event that a number of the digits in the respective places from the most significant toward the least significant are equal and the number Z is greater than the number P. When this situation occurs, the switches having arms 278 provide a series circuit which energizes windings 236 through the conductor 210 of the first place in which the number Z is greater than the number P in the direction from the most significant toward the least significant place.

It will be seen that I have accomplished the objects of my invention. I have provided a digital zero offset position indicator which gives an indication of the amount and direction of displacement of a movable member such as a machine tool from an arbitrary zero point. My system permits any zero point in the range of position of the movable member to be rapidly and expeditiously set into the device. By using my apparatus, a machine tool operator can work directly from blueprint dimensions in forming a workblank to the desired shape.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A digital zero offset position indicator for indicating in a plurality of places of significance the displacement of a member from an arbitrarily selected zero position within the range of movement of said member including in combination means producing a digital representation of the actual position of said member in the form of electrical signals representing respective digits of a number indicating the actual position of said member, a plurality of respective subtracting means producing signals characteristic of the magnitudes of differences between correspondingly significant minuend and subtrahend digit signals, respective means for producing relative magnitude signals characteristic of the relative magnitudes of corresponding minuend and subtrahend digits, each of said subtracting means and said relative magnitude signal producing means comprising positionable means positioned at a location corresponding to a digit of a number indicating said arbitrarily selected zero position, means for coupling respective actual position signals to respective positioned means and means responsive to the relative magnitude signal corresponding to a place of certain significance modifying the subtracting means signal in the place next most significant to that certain place to cause the next most significant place subtracting means signal to represent a digit which is one less than the actual difference between the minuend and subtrahend digits in the next most significant place when the subtrahend digit is greater than the minuend digit in the certain place.

2. A digital zero offset position indicator for indicating in a plurality of places of significance the displacement of a member from an arbitrarily selected zero position within the range of movement of said member including in combination means producing a digital representation of the actual position of said member in the form of electrical signals representing respective digits of a number indicating the actual position of said member, a plurality of respective subtracting means producing signals characteristic of the magnitudes of differences between correspondingly significant minuend and subtrahend digit signals, respective means for producing relative magnitude signals characteristic of the relative magnitudes of corresponding minuend and subtrahend digits, each of said subtracting means and said relative magnitude signal producing means comprising positionable means positioned at a location corresponding to a digit of a number indicating said arbitrarily selected zero position, means for coupling respective actual position signals to respective positioned means to cause said subtracting means normally to subtract said zero position number from said actual position number and means responsive to the relative magnitude signal corresponding to the most significant place for modifying said subtracting means to cause said last named means to subtract said actual position number from said zero position number.

3. A digital zero offset position indicator for indicating in a plurality of places of significance the displacement of a member from an arbitrarily selected zero position within the range of movement of said member including in combination means producing a digital representation of the actual position of said member in the form of electrical signals representing respective digits of a number indicating the actual position of said member, a plurality of respective subtracting means producing signals characteristic of the magnitudes of differences between correspondingly significant minuend and subtrahend digit signals, respective means for producing relative magnitude signals characteristic of the relative magnitudes of corresponding minuend and subtrahend digits, each of said subtracting means and said relative magnitude signal producing means comprising positionable means positioned at a location corresponding to a digit of a number indicating said arbitrarily selected zero position, means for coupling respective actual position signals to respective positioned means to cause said subtracting means normally to subtract said zero position number from said actual position number, each of said subtracting means comprising output channels corresponding respectively to zero and to the digits from one to nine, indicating means comprising a plurality of banks of indicators, the indicators of each bank corresponding respectively to zero and to the digits from one to nine, means normally connecting the output channels of each of said subtracting means respectively to the corresponding indicators of a respective bank and means responsive to the relative magnitude signal corresponding to the most significant place for modifying said connecting means to connect said output channels of said subtracting means to indicators of the associated bank which correspond to digits which are decimal complements of the digits to which the channels correspond.

4. A digital zero offset position indicator for determining the difference in a plurality of places of significance between the actual position of a movable member and an arbitrary reference position including in combination means responsive to movement of said member for producing a binary-coded decimal representation in said places of significance of the actual position of said member, means for converting said binary-coded decimal representation to a decimal representation in said places of significance of said actual position, a plurality of subtraction matrices corresponding to said places of significance, each of said subtraction matrices producing an output characteristic of the magnitude of the difference between a pair of digits in a place of significance in response to inputs representing said digits coupled thereto, a plurality of comparison matrices corresponding to said places of significance, each of said comparison matrices producing an output characteristic of the relative magnitude of a pair of digits in a place of significance in response to inputs representing said digits coupled thereto, means for coupling the decimal representation of said converting means in said places of significance respectively to said subtraction and comparison matrices in corresponding places of significance as one input thereto, means for coupling a representation of said reference position in said places of significance respectively to said subtraction and comparison matrices in corresponding places of significance as a second input thereto and means responsive to the outputs of said subtraction and comparison matrices for indicating the difference between the actual position and said reference position.

5. A digital zero offset position indicator for determining the difference in a plurality of places of significance between the actual position of a movable member and an arbitrary reference position including in combination means responsive to movement of said member for producing a binary-coded decimal representation in said places of significance of the actual position of said member, a plurality of groups of output channels, said groups corresponding to said places of significance, the channels of each group corresponding respectively to zero and to the digits from one to nine, switching means responsive to said binary-coded decimal representation for rendering one channel of each group operative to produce a decimal representation in said places of significance of said actual position number, a plurality of subtraction matrices corresponding to said places of significance, each of said subtraction matrices producing an output characteristic of the magnitude of the difference between a pair of digits in response to inputs representing said digits coupled thereto, a plurality of comparison matrices corresponding to said places of significance, each of said comparison matrices producing an output characteristic of the relative magnitude of a pair of digits in response to inputs representing said digits fed thereto, means connecting each of said groups of channels to a subtraction matrix and to a comparison matrix as one input, means for coupling a representation of said reference position in said places of significance respectively to said subtraction and comparison matrices in corresponding places of significance as a second input and means responsive to the outputs of said comparison and subtraction matrices for indicating the difference between the actual position and the reference position.

6. Apparatus for displaying a digital decimal representation of the position of a positionable machine tool element with reference to an arbitrary position including in combination a binary-coded analogue to digital converter comprising a member positioned in response to displacement of said element to cause said converter to produce an output which is a binary-coded representation of the position of said member, means for translating said output binary-coded representation to a digital decimal output, and means including multiple decade means responsive to the output of said translating means for displaying a visible digital decimal numerical representation of the position of said machine tool element with reference to said arbitrary position.

7. Apparatus for displaying a digital decimal numerical representation of the position of a positionable machine tool element including in combination a binary-coded analogue to digital converter comprising a member positioned to cause said converter to produce an output which is a binary-coded representation of the position of said member, digital decimal difference determining means comprising positionable means for setting a number into said difference determining means, said last-named means being responsive to the position of its positionable means and to a digital decimal representation coupled thereto for producing outputs characteristic of the digital decimal difference between the number represented by the position of said positionable means and the number represented by the digital decimal representation coupled thereto, means for translating said output binary-coded representation to a digital decimal output, means for coupling said translating means output to said difference determining means, and multiple decade means responsive to the output of said difference determining means for visibly displaying the digital decimal number difference between the number represented by the position of said positionable means and the number represented by said converter output.

References Cited by the Examiner
UNITED STATES PATENTS

| | | | |
|---|---|---|---|
| 2,061,745 | 11/1936 | Wadel | 235—168 |
| 2,330,588 | 9/1943 | Jewell | 340—177 |
| 2,333,406 | 11/1943 | Ballard | 340—177 |
| 2,636,167 | 4/1953 | Schuch | 340—179 |
| 2,647,961 | 8/1953 | Sounders et al. | 200—1 |
| 2,653,761 | 9/1953 | Lawrence | 235—168 |
| 2,668,200 | 2/1954 | Glaze | 200—1 |
| 2,685,054 | 7/1954 | Brenner | 340—204 |
| 2,828,482 | 3/1958 | Schumann | 340—179 |
| 2,839,711 | 6/1958 | Tripp | 340—198 |
| 2,969,490 | 1/1961 | Anderson | 318—162 |
| 2,997,638 | 8/1961 | Brittain | 318—162 |

NEIL C. READ, *Primary Examiner.*

ELI J. SAX, L. MILLER ANDRUS, THOMAS B. HABECKER, *Examiners.*